May 26, 1925.
E. J. VON PEIN
1,539,447
CASH REGISTER
Filed Nov. 18, 1921      7 Sheets-Sheet 2
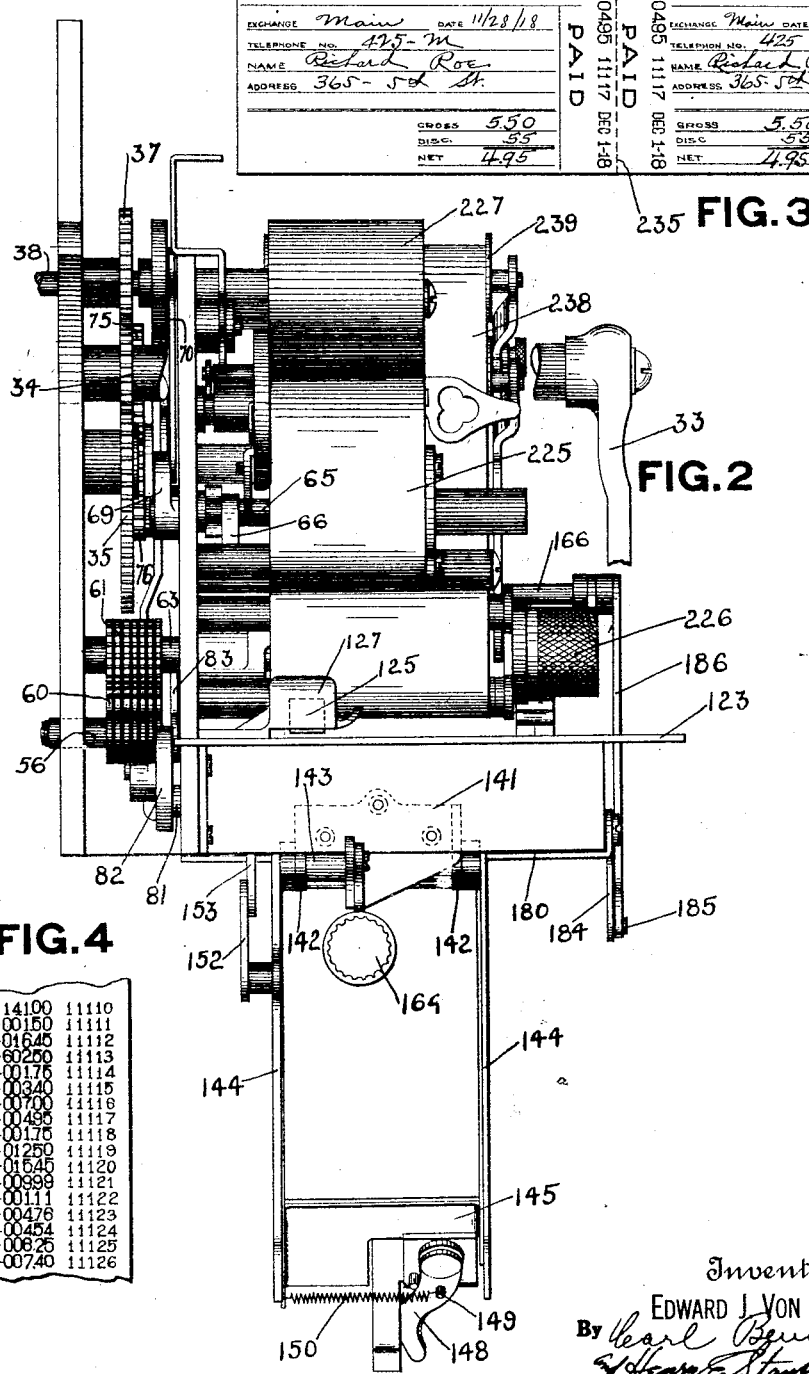

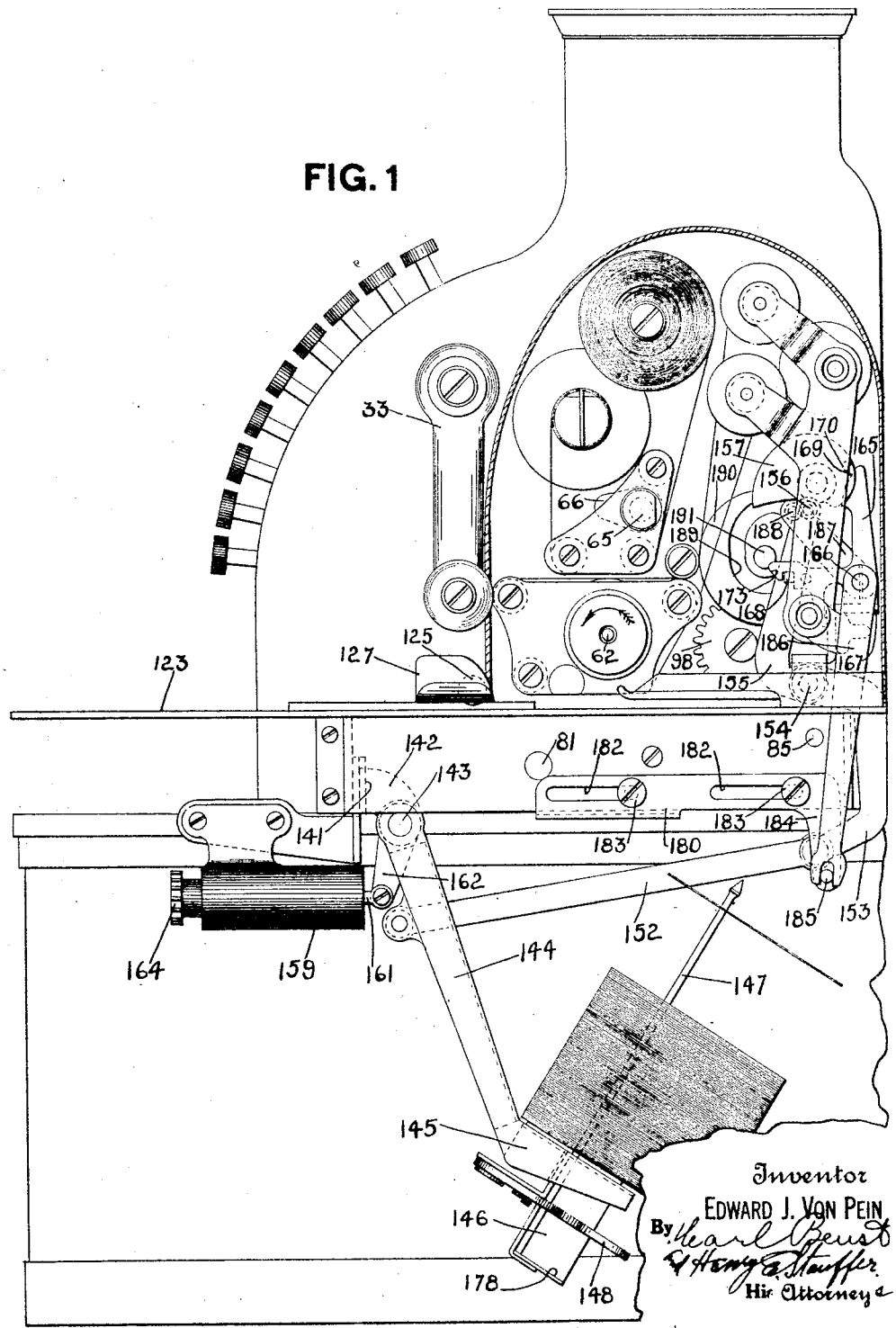

May 26, 1925.  
E. J. VON PEIN  
1,539,447  
CASH REGISTER  
Filed Nov. 18, 1921  7 Sheets-Sheet 3

Inventor  
EDWARD J. VON PEIN  
By Earl Benst  
Henry E. Stauffer  
His Attorneys May 26, 1925.
E. J. VON PEIN
1,539,447
CASH REGISTER
Filed Nov. 18, 1921  7 Sheets-Sheet 4
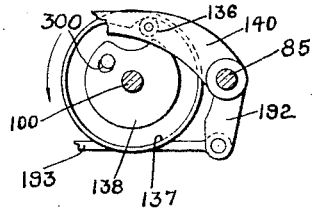
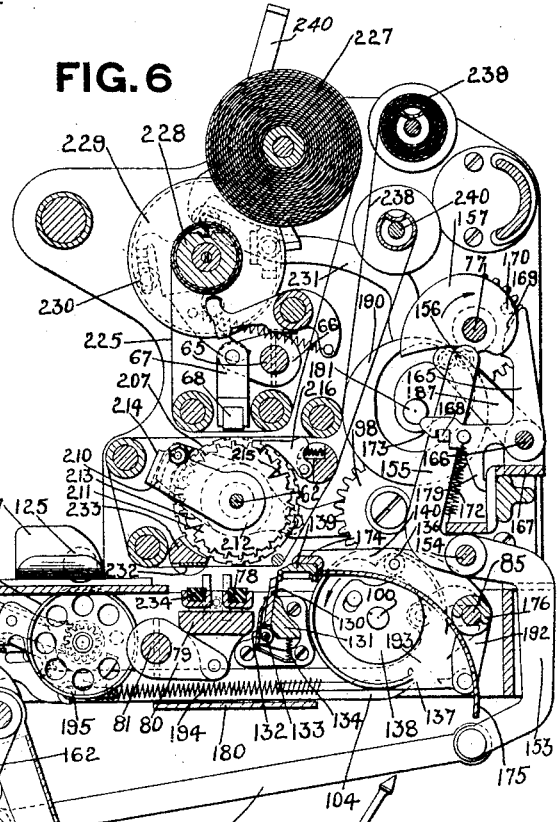

May 26, 1925.
E. J. VON PEIN
1,539,447
CASH REGISTER
Filed Nov. 18, 1921
7 Sheets-Sheet 5
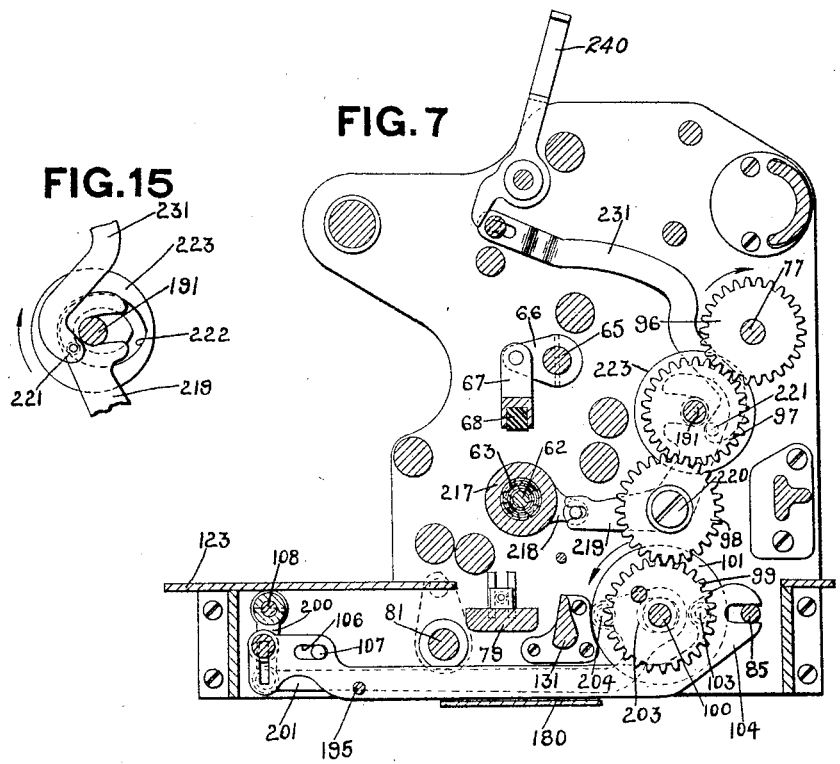
FIG. 7
FIG. 15
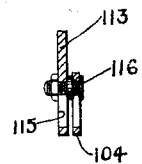
FIG. 17
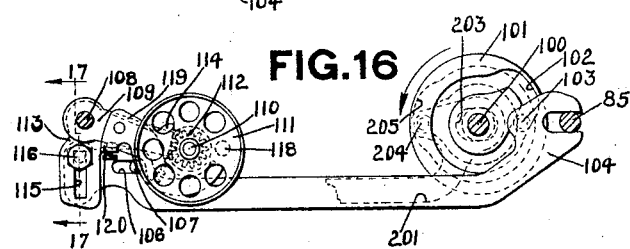
FIG. 16

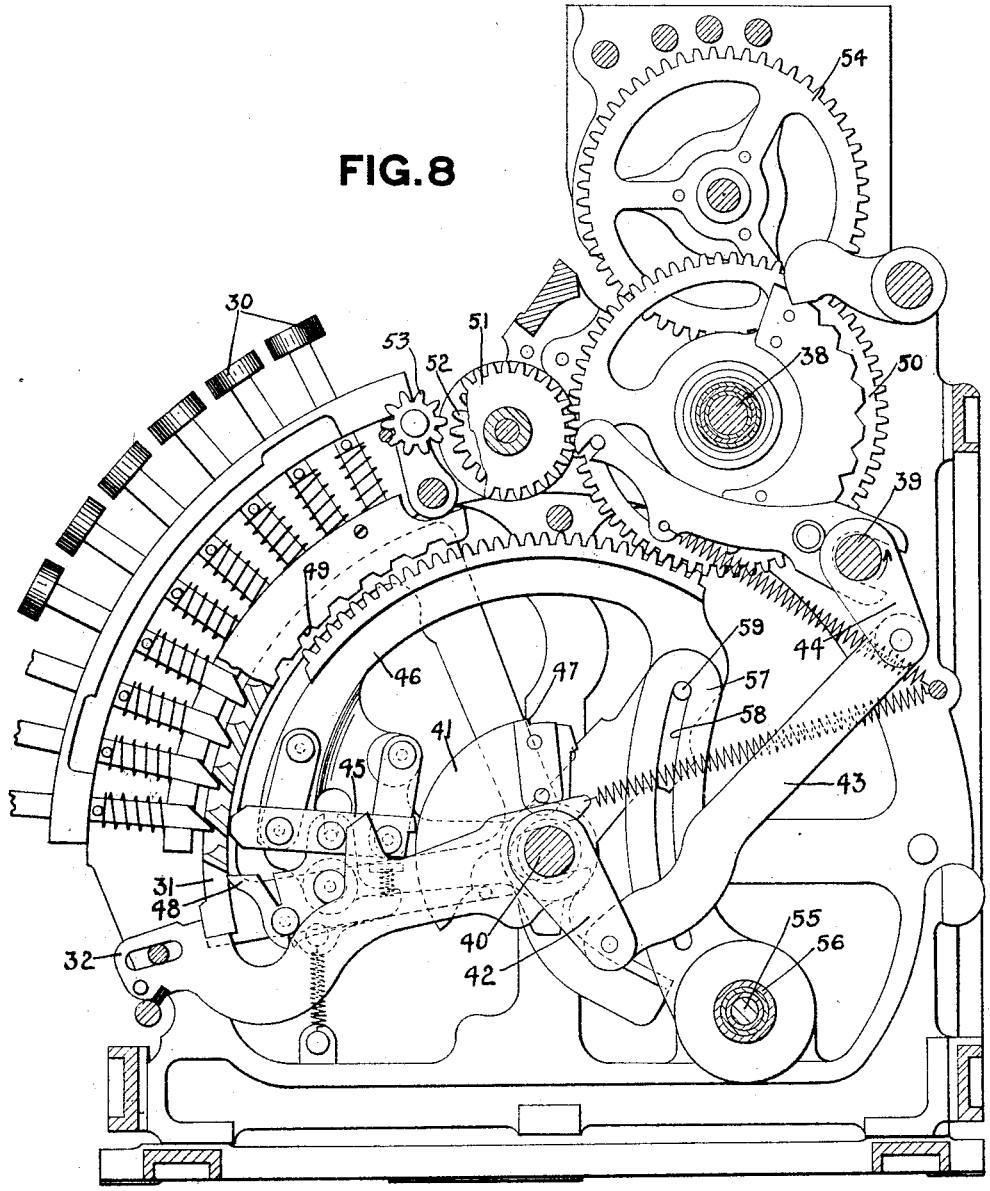

May 26, 1925.

E. J. VON PEIN 1,539,447

CASH REGISTER

Filed Nov. 18, 1921

Inventor
EDWARD J. VON PEIN
By Carl Beust
and Henry E. Stauffer
His Attorneys

Patented May 26, 1925.

1,539,447

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO.

CASH REGISTER.

Application filed November 18, 1921. Serial No. 516,100.

*To all whom it may concern:*

Be it known that I, EDWARD J. VON PEIN, a citizen of the United States, residing at Dayton, in the county of Montgomery and State of Ohio, have invented certain new and useful Improvements in Cash Registers, of which I declare the following to be a full, clear, and exact description.

This invention relates to improvements in severing and filing mechanisms for machines adapted to print on an inserted slip.

The principal object of this invention is to provide novel means for severing an inserted slip between duplicate printed impressions thereon and also to provide a filing means for automatically filing the stub portion of the severed slip.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Of said drawings:

Fig. 1 is a right hand side elevation of the machine to which this invention is shown adapted, and shows the position of the filing device.

Fig. 2 is a front elevation of the printer and shows some of the novel features of the machine.

Fig. 3 illustrates a sample slip which is adapted to be used with the mechanism shown herein, the figures and the word "Paid" printed across the slip being printed by the machine.

Fig. 4 illustrates a portion of the record strip printed by this machine.

Fig. 6 is a sectional view of the printer taken on the line 6—6 of Fig. 5 looking in the direction of the arrows, and shows the printing, severing and filing mechanisms.

Fig. 7 is a sectional view taken on the line 7—7 of Fig. 5 looking in the direction of the arrows, and shows the gearing by which the power is transmitted to the slip feeding mechanism.

Fig. 8 is an enlarged sectional view taken just to the right of one of the banks of amount keys and shows the main operating elements of the machine to which the present invention is shown adapted.

Fig. 11 is a detail view of the knife cam and arms.

Fig. 12 is a detail view of the cam and arm for operating a device for forcing the stubs down on the pin file.

Fig. 13 is a detail view of the slip tension device.

Fig. 14 is a detail view taken on line 14—14 of Fig. 6 looking in the direction of the arrows, and shows the table and the means for holding the detachable filing pin thereon.

Fig. 15 is a detail of the cam for feeding the detail strip and operating the consecutive number printing wheels.

Fig. 16 is a detail view of the slip feeding mechanism and the mechanism for operating it.

Fig. 17 is a detail sectional view taken on line 17—17 of Fig. 16, looking in the direction of the arrows, and shows the means for adjusting the extent of movement of the feeding roller.

Figure 5:
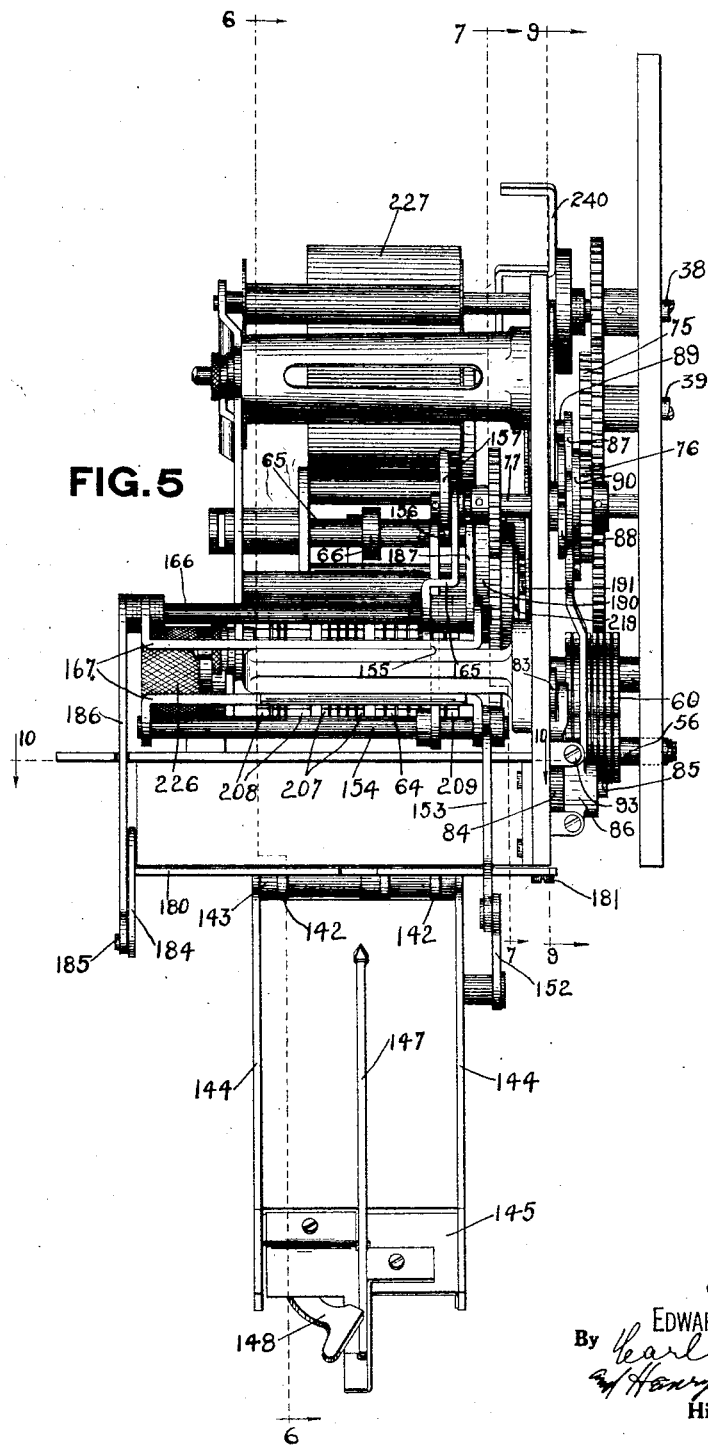
Fig. 5 is a rear elevation of the printer and shows the filing mechanism used.

In its present form the invention is shown adapted to a cash register of the type shown and described in Letters Patent of the United States, No. 580,378, issued April 13, 1897, to Cleal and Reinhard, and Letters Patent of the United States No. 754,049 issued March 8, 1904, to Thomas Carroll. As the mechanism shown in these patents forms no part of the present invention, only a brief description thereof will be given, reference being made to these patents for a full and complete description of the machine.

*Operating mechanism.*

The machine to which the present invention is shown applied is of the two motion type, that is, one in which entries are made by depressing the corresponding keys of the keyboard and then turning the operating handle. The machine has a plurality of amount banks or sections and a clerk's bank, each bank having a vertical row of depressible keys 30 (Fig. 8) numbered from 1 to 9 in the amount banks, and lettered A, B, etc. in the clerk's bank. The keys are held in depressed position until near the end of the operation by a detent 31 and a retaining bar 32.

An operating handle 33 (Fig. 1) has fast thereto a pinion 34 (Fig. 9) which meshes with an intermediate gear 35 rotatably mounted on a stud in the machine frame. The intermediate gear 35 meshes with a gear 36 fast on the right hand end of a shaft 38. The gear 36 meshes with a gear 37 fast on a shaft 39 extending through the machine. This gearing is so proportioned that for every two revolutions of the operating handle the gears 36 and 37 receive one complete revolution. Nearly all of the devices of the machine are operated from shafts 38 and 39.

*Differential mechanism.*

Running transversely through the machine frames is a rock shaft 40 (Fig. 8) secured to which is a plate 41 for each bank of keys. Attached to this rock shaft is an arm 42 which is connected by a link 43 to a shorter arm 44 fastened to the driving shaft 39. When the shaft 39 makes a rotation the arm 44 is rotated with it and as the arm 44 is shorter than the arm 42, the latter and the shaft 40 will be oscillated through an arc of about 90°, first counter clockwise and then clockwise. During counter clockwise movement a plunger 45 carried by a segment 46 is moved into engagement with a shoulder 47 on the plate 41, and through this connection carries the segment 46 upward during the clockwise movement of the plate 41 until a trip 48, which is operatively connected to the plunger 45, strikes the end of a depressed key. This causes the plunger 45 to be disengaged from the shoulder 47 thereby disconnecting the segment 46 from the plate 41. As the plunger is moved away from the shoulder 47 it is projected into one of the notches 49 corresponding to the key depressed, thus holding the segment 46 in its moved position. The segment 46 is in mesh at all times with an intermediate gear 50 which in turn meshes with a gear 51 carrying a pinion 52 adapted to be operatively connected to a similar pinion secured to a totalizer element (not shown) by a connecting pinion 53 carried by arms supported by a rock shaft as shown. The gear 50 also meshes with a smaller gear (not shown) secured to a gear 54 secured to the usual indicator wheels. Through this series of connections the differential movement of the segment 46 is transmitted to the totalizer and indicating devices so as to add and indicate the value represented by the key depressed.

*Printing mechanism.*

Extending across the machine is a shaft 55 and a series of nested sleeves 56. Rigidly attached to the shaft 55 and to each sleeve 56 is an arm 57 provided with a curved slot 58 cooperating with a stud 59 on the segment 46. Through this connection any movement of the segments 46 is transmitted to either the shaft 55 or the proper sleeve 56. At their right hand ends the shaft and sleeves carry segments 60 (Figs. 2, 5 and 9) meshing with pinions 61 attached to nested sleeves 63 carrying the amount printing wheels 64 and the clerks' printing wheels 209 and supported on a shaft 62 (Fig. 5). The slots 58 are so formed that movement of a segment 46 will, through the intervening mechanism just described, rotate the corresponding type wheel 64 or 209 to bring to printing position a figure or character to represent the key depressed in that particular bank of the machine.

In addition to the amount and clerks' type wheels there are five consecutive number type wheels 207 (Figs. 5 and 6) and four date type wheels 208. The type wheels 64, 207 and 209 have two sets of type on their peripheries, one set for printing on the record strip and the other set for printing on an inserted slip to be hereinafter described. The type wheels 208 print only on the slip, and therefore are provided with only one set of type.

The consecutive number wheels 207 are loose on the shaft 62 and are operated, at each operation of the machine, by a spring pressed differentially tined pawl 210 (Fig. 6) which cooperates with ratchets 211 secured to said wheels. The pawl 210 is carried by parallel arms 212 and 213 loose on the shaft 62 and integrally connected by a yoke 214. Transfer from the units to the tens etc. is effected when the pawl is permitted by deep notches 215 in said ratchets to simultaneously engage a plurality of ratchets. The wheels are kept from retrograde movement by spring pressed retaining pawls 216, which cooperate with the ratchets 211.

Integrally connected to the arm 213 by a sleeve 217 is an arm 218 (Figs. 6 and 7) having a pin and slot connection with a bell crank 219 pivoted at 220. The upper arm of the bell crank 219 is bifurcated to surround a shaft 191 and carries an anti-friction roller 221 (Fig. 15) cooperating with a cam race 222 formed in a disk 223 fast on said shaft. The pin that carries the roller 221 extends through the bell crank into a link 231.

By means to be hereinafter described, the disk 223 is rotated and through the cam race 222 rocks the bell crank 219 first clockwise (Fig. 17) and then counter clockwise. This movement rocks the arms 218, 213 and 212, thereby causing the pawl 210 to operate the consecutive number type wheels 207 in the usual manner.

The date type wheels 208 are secured to nested sleeves located inside of the usual return-to-zero knurled knob 226 (Figs. 2 and 5) of the consecutive counter.

Aligning mechanism is provided for the type wheels but is not shown as this mechanism is not a part of the present invention. Any well known form of aligning device may be used.

The record strip 225 (Figs. 2 and 6) is fed from the supply roll 227 between a platen 68 and the type wheels above described, and wound upon a receiving roll 228. The receiving roll has a flanged disk 229 secured thereto, which is rotated by the well known clutch mechanism 230, operated by a link 231, (Figs. 7 and 15), which receives its motion from the previously described roller 221 and cam race 222.

The link 231 is connected to the clutch by a slot and pin connection permitting feeding movement of the feed roll independently of said link as a lever 240 is moved counter clockwise.

A sample portion of the record strip is shown in Fig. 4. The first column of printing represents the clerks' initials; the next column represents the amount of each transaction; and the third or right hand column represents the consecutive numbers.

The mechanism for taking an impression from the above described type wheels upon the record strip will now be described. Attached to a short shaft 65 (Figs. 7 and 9) is a pair of arms 66 to which is pivoted a frame 67 carrying a platen 68 of rubber or other resilient material. Fastened to the left hand end of the shaft 65 is an arm 69 pivoted to a pitman 70 forked at its upper end to receive the shaft 38 and carrying an anti-friction roller 71 engaging in a cam slot 72 of a box cam 73 fast on the right hand end of shaft 38. As this shaft is given one complete revolution at each operation of the machine it can be seen that the arm 69 and therefore the frame 67 will be rocked first counter clockwise to press the detail strip against the type wheels to produce an impression thereon and then clockwise to normal position. The cam groove 72 is so timed that the operation of the platen will take place just before the end of the operation of the machine.

The means for inking the type wheels and an electrotype 232 carried on a rod 233 is an ink ribbon 238 (Figs. 2 and 6) wound from a spool 239 to a spool 240. Any well known form of ribbon feeding and reversing mechanism may be employed.

Slip printing.

The slip printing mechanism is driven from the gear 37 (Fig. 9) fast on the right hand end of shaft 39. This gear has fast thereto a gear 75 which meshes with a gear 76 fast on a short shaft 77. The gear 76 being the same size as the gear 75, will make one complete revolution upon every operation of the machine.

The impressions taken from the type wheels upon the inserted slip are made by a platen 78 (Figs. 6, 7 and 10) carried by a frame 79 pivoted to a pair of arms 80 fast on the shaft 81. Fast on the left hand end of the shaft 81 is a short arm 82 (Fig. 2) connected by a link 83 (Fig. 9) to an arm 84 loose on the rod 85. Just to the left of the arm 84 is another arm 86 loose on rod 85 and flexibly connected with a pitman 87 slotted near its upper end to surround the shaft 77 by which it is guided in its movements. Fast on the shaft 77 is a cam 88 whose periphery cooperates with an antifriction roller 89 mounted on the upper end of the pitman 87. Fast to the gear 76 is another cam 90 whose periphery cooperates with an anti-friction roller 91 mounted on the pitman 87 below the slotted portion thereof. The parts as shown in Fig. 9 are in their home positions and it can be seen that the cams are shaped to lower and raise the pitman twice during each operation of the machine to take two impressions from the type wheels upon the inserted slip near the end of the operation of the machine.

The electrotype 232 before referred to is for printing on the slip and may be of any desired form. For illustrative purposes, it prints the word "Paid". Cooperating with this electrotype is a platen 234, carried by the frame 79.

Figure 9:
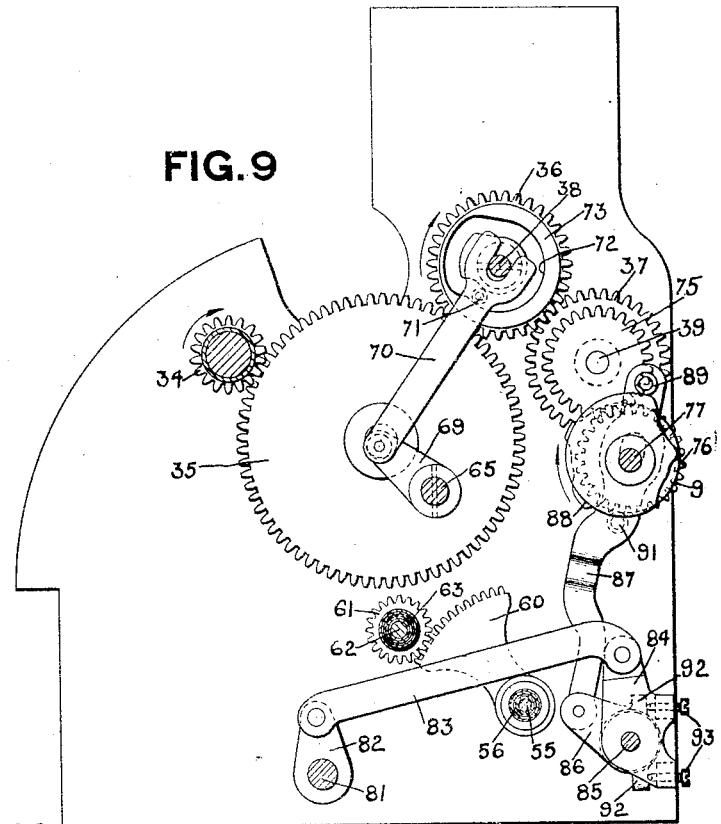
Fig. 9 is a vertical sectional view on line 9—9 of Fig. 5, looking in the direction of the arrows, and shows the main driving mechanism of the machine and also the connections by which the lower platen is raised to print on the inserted slip.

A device is shown in Fig. 9 for regulating the impression of the platen 78 against the type wheels 64 and of the platen 234 against the electrotype 232. The arm 86 has a broad hub which carries two ears 92 one projecting upwardly and the other downwardly from the hub. The hub of the arm 84 is formed to carry two screws 93 whose inner ends contact with the ears 92 on the hub of the arm 86. The loosening of the lower screw 93 and the tightening of the upper screw will change the relative positions of the arms 84 and 86 so that the arms 80 will not raise the platens to the same height, thereby causing lighter impressions to be made than before the adjustment. An opposite adjustment of the screws 93 will move the platens to a higher position of rest and cause heavier impressions to be taken. The platen carrying frame 79 is guided in its movement by a stud 95 (Fig. 10) which moves in a slot formed in the printer side frame.

The mechanism for feeding the slip between the two impressions is driven by a train of gears located just to the right of the printer side frame (Fig. 7). Fast on the shaft 77 is a gear 96 meshing with a gear 97, which drives a gear 98 on a stud 220 and in mesh with a gear 99 fast on a shaft 100. By means of this train of gears the shaft 100 is given one complete rotation at every operation of the machine. Fast to the shaft 100 is a cam disk 101 (Figs. 7 and 16) in the right hand face of which is a cam race 102, which cooperates with an anti-friction roller 103 on a pitman 104. At its rear end this pitman is bifurcated and straddles the rod 85 and at its forward end it is supported by a stud 107 which passes through an elongated slot 106 therein. Fast on a short shaft 108 (Figs. 10 and 16) is an arm 109 which supports a short shaft 110. The shaft 110 at its right hand end carries a flanged disk 111 and on its other end a pinion 112. The rearwardly extending arm of a bell crank 113 loosely mounted on the shaft 108 carries a segment 114 meshing with the pinion 112. The downwardly extending arm of the bell crank 113 has a slot 115 through which extends a bolt 116. As shown in Fig. 17 the bolt 116 passes through a vertical slot in the forward end of the pitman 104 and then through the slot 115 in the bell crank 113, and is provided with a nut by which the bolt may be held in any portion of the slot 115. This bolt is provided so that the feeding movement imparted to the inserted slip, between its printing impressions may be adjusted. It can be seen from Fig. 16 that as the position of the bolt in the slot 115 is lowered a smaller amount of movement will be imparted to the bell crank 113 and through the segment 114 carried thereby cause the knurled feeding disk 111 to be rotated a smaller extent and thereby feed the inserted slip a shorter distance.

The knurled disk is provided with a pin 118 cooperating with the end of an arm 119 pivoted on a stud in the side of the arm 109. This arm at its forward end carries a projection 120 which is bent under the arm 109 and which carries a set screw therein, the inner end of the set screw abutting against the bottom of the arm 109. The stud 118 contacts with the end of the arm 119 at the end of the feeding movement of the disk to prevent overthrow of the disk during a speedy operation of the machine. It can be seen that adjustment of this set screw will either raise or lower this stop and thereby permit of a very fine adjustment thereof. This is essential as the feeding mechanism must feed the inserted slip a predetermined extent between the printing impressions.

In order to raise the knurled feeding disk into position to feed the slip the following mechanism is provided. Fast on the left hand end of the shaft 108 is an arm 200 (Fig. 7) to which is pivoted the forward end of a pitman 201 which near its rear end is provided with an elongated slot 203 surrounding the hub of the previously decribed cam disk 101. The rear end of this pitman also carries an anti-friction roller 204, which projects in the cam race 205 in the left hand face of the disk 101. The configuration of the race 205 is such that the pitman is moved to rock the shaft 108 and arm 109 to raise the disk 111 to the proper position before the first impression and to maintain it in this position until the second impression has been made. The reciprocating movement of the pitman 104 through the bolt 116, rocks the bell crank 113 whereby the segment 114 thereon rotates the pinion 112 and the disk 111 to feed the slip the proper distance between the two printed impressions thereon.

Mounted on a table 123 (Figs. 1, 2 and 6) is a device for maintaining the tension on the inserted slip while it is being printed and also for cooperating with the knurled feeding disk 111. It consists of a yoke 124 (Fig. 13) carrying a roller 125. The yoke is pivoted on a shaft 126 mounted in the sides of the casing 127. Around the shaft is a torsion spring 128, one end of which is bent over the top of the yoke 124 and the other end of which rests against the front wall of the casing. The tension of this spring is such as to force the roller down through the opening in the bottom of the casing, but the downward movement of the roller is limited by a pin 129 which engages an upwardly extending portion of the yoke 124.

A sample of the slip is illustrated in Fig. 3. The words "Paid" are printed by the electrotype 232 and the other two lines of printing appearing crosswise on the slip are printed by the type wheels 64, 207, 208 and 209. The slip is severed, by means to be hereinafter described, on the line 235. The large portion is given to the customer and the smaller portion is automatically filed in the machine.

Figure 10:
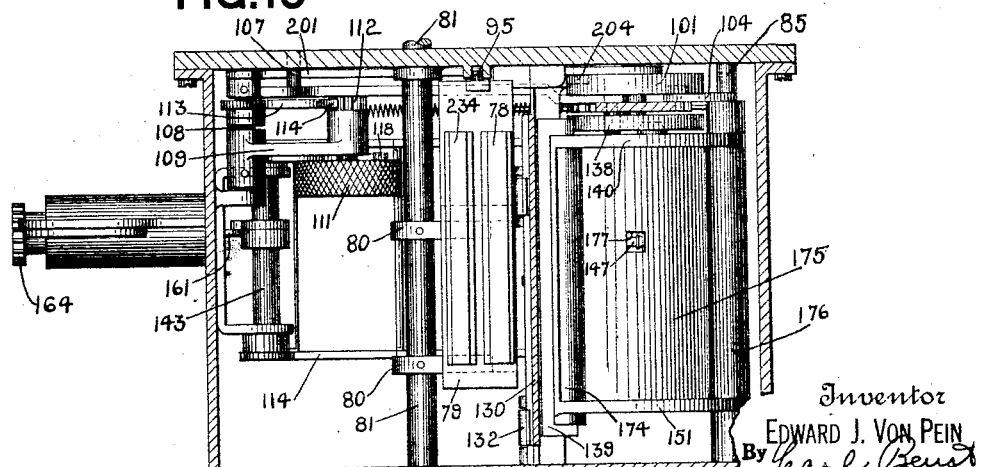
Fig. 10 is a horizontal section taken on line 10—10 of Fig. 5 looking in the direction of the arrows, and shows the severing mechanism, the lower platens, and the slip feeding device.

The severing mechanism consists of a stationary knife 130 (Fig. 6) which is held against a knife block 131 by spring pressed clips 132. The spring clips are pivotally mounted on a rod 133 carried by extensions of the knife block 131 and have rearwardly extending portions which cooperate with springs 134 to force the clips against the knife and hold it in position. A movable knife 139 is carried by a frame consisting of two arms 140 and 151 connected by transverse members 174 and 176 (Figs. 6 and 10). The member 176 is pivoted on the rod 85. The arm 140 carries an anti-friction roller 136 which cooperates with a cam groove 137 cut in the side of a cam disk 138 secured to the gear 99 by a pin and slot connection 300. The conformation of the cam groove is such that the knife will be lowered to sever a portion of the inserted slip near the end of the operation of the machine and then returned to its normal position. The pin and slot connection between the cam and its driving gear permits of the severing operation taking place nearer the end of the operation of the machine.

The arm 140 has integral therewith an arm 192 to which is pivoted one end of a member 193, to the opposite end of which is fastened a coil spring 194 secured to a stud 195 carried by the pitman 104. When the pitman 104 is given its forward movement and the member 193 is moved rearwardly near the end of the operation of the machine as the slip is severed, the spring 194 is tensioned to automatically return the knife frame to normal position, this operation being made possible by the pin and slot connection between the cam disk 138 and its driving gear 99.

Filing mechanism.

The means for automatically filing the stub or severed portion of the inserted slip will now be described. Fast to the front wall of the frame which supports the slip table is a plate 141 (Figs. 1, 2, 3 and 6) having two downwardly extending arms 142 which at their lower ends carry a short shaft 143. Secured on the ends of this shaft 143 are arms 144. These arms at their lower ends are bent slightly upward and carry a table 145 (Fig. 13) for supporting the severed portions of the slips.

This table has a depending portion 146 the walls of which form a right angle with its apex at the center of the table. A member 148 pivoted to a bent back portion of the table 145 cooperates with said angular portion to hold a square pin 147 in position, the member 148 being held against the pin by a spring 150 stretched between a stud 149 and the left hand arm 144 (Fig. 2). A hole in a horizontal member 178 on the walls 146 permits the pin 147 to be slid by undue pressure placed thereon as slips are forced down over the pin.

Near its upper end the left hand arm 144 is connected to a link 152 pivoted to the lower end of an arm 153 fast on a shaft 154. Also fast on the shaft 154 is an arm 155 which carries at its upper end an anti-friction roller 156 engaging the periphery of a cam 157 (Fig. 6). This cam is fast on the shaft 77 and receives one complete revolution at every operation of the machine. The shape of the cam is such that the arms 155 and 153 will be rocked counter clockwise, thereby rocking the arms 144 counter clockwise, raising the table 145 and bringing the pin 147 into position to impale the portion of the inserted slip to be severed. When the anti-friction roller 156 passes the highest point of the cam 157 and is then released thereby and allowed to return to normal position the table 145 drops, actuated by the force of gravity, to its normal position.

To assist in the return of the table to its normal position there is provided a spring plunger 158 which operates in a cylinder 159 (Fig. 6) supported by an arm fast to the printing table supporting frame. A coil spring 160 is contained in the cylinder 159. The plunger 158 has a connecting rod 161 connected to the lower end of an arm 162 fast on the shaft 143. As the shaft 143 is rocked counter-clockwise by the raising of the table 145 the arm 162 is also rocked counter clockwise and by means of the connecting rod 161 draws the plunger toward the rear thereby compressing the spring 160. When the arm 155 is released from the cam 157 the force of the compressed spring assists the force of gravity to restore the table 145 to normal position.

In order to prevent a jar when the table reaches its extreme lowered position the plunger 158 is fitted in the cylinder 159 to compress air as it is returned to its normal position. A vent 163 is provided to permit this compressed air to escape slowly and the speed with which the air is permitted to escape is controlled by a screw plug carrying an inlet valve 164. The position of the screw plug regulates the escape of air through the vent 163.

Means is provided whereby the table 145 which carries the pin 147 is automatically locked in its normal position at the end of an operation from which it is automatically released at the beginning of a subsequent operation. This means consists of a bell crank 165 (Fig. 6) pivotally mounted on a shaft 166 which is supported by a yoked member 167. The forwardly extending arm of this bell crank 165 has, near its end, a square cut which cooperates with a square lug 168 on the arm 155.

The upwardly extending arm of the bell crank 165 (Fig. 6) has a beveled surface 169 which is adapted to contact with a stud 170 extending from the side of the cam disk 157. Upon the operation of the machine the cam disk 157 is rotated in a clockwise direction, and the stud 170 thereon contacts with the beveled surface 169 of the bell crank 165 and rocks the bell crank in a clockwise direction. This disengages the forwardly extending arm of the bell crank 165 from the square lug 168 as a neutral portion of the cam disk 157 slides over the arm 155. After the arm 155 is unlocked the cam disk 157, through the various operating connections, raises the table 145 and pin 147. The forwardly extending arm of the bell crank 165 has a downwardly projecting portion 179 which in its normal position rests against the supporting yoke frame 167 and prevents the bell crank 165 from dropping below its normal position after the stud 170 has passed from the beveled portion 169 and allowed the bell crank to return to normal. A spring 172 is fast at its upper end to a stud in the forwardly extending arm of the bell crank 165 and at its lower end to the supporting frame 167. This spring 172 is for the purpose of returning the bell crank 165 to its normal position after it has been rocked on its pivot 166. As the arm 155 nears it home position the square lug 168 comes into contact with a beveled surface 173 on the end of the forwardly extending arm of the bell crank 165 and rocks the bell crank clockwise on shaft 166 until the square lug 168 has reached its normal position at which time the spring 172 returns the bell crank to its normal position.

A paper guide 175 (Figs. 6 and 10) is fastened to the lower sides of the arms 140 and 151 which carry the movable knife 139. This paper guide serves the purpose of deflecting the severed stub in a downward direction and has cut therein a square opening 177 through which the end of the pin 147 projects when the table 145 is raised to its highest position. As the stub is at that time between the pin 147 and the paper guide, said pin will be forced through the stub and upon its return to normal position will carry the stub with it.

The knife operating means is so timed that the paper guide 175 carried by the knife is moved toward the filing pin at the time the pin approaches the paper and just before it completes its upward movement. The paper and pin are therefore both moved each toward the other as the impaling takes place.

It can be seen that if no means were provided to force the severed stubs downward on the pin that after several stubs had been impaled there would be a certain amount of congestion and a hard operation of the machine would result. The mechanism which is provided to obviate this difficulty will now be described.

A plate 180 (Figs. 1, 2, 3 and 6) passes transversely under the printer, its right hand end (as viewed in Fig. 5) being supported by a screw 181 which passes through a slot in the plate 180 into the side frame of the printer. At one end the plate 180 is bent upward at right angles, the bent portion containing two elongated slots 182 (Fig. 1) through which pass screws 183 into the frame which supports the printing table. At its rear end the bent portion of the plate 180 has a depending arm 184 which at its lower end carries a stud 185. An arm 186 is fast to the end of the shaft 166 and is bifurcated to straddle the stud 185. Also fast on the shaft 166 is an arm 187 which carries at its upper end an anti-friction roller 188 cooperating with a cam groove 189 in the face of a disk 190 which is fast on the shaft 191. The disk 190 receives one complete revolution at each operation of the machine. The cam groove 189 of disk 190 is so designed that the arm 187 will be rocked to slide the plate 180 first rearwardly and then forwardly to its normal position. The plate 180 has cut in its rear edge a square hole sufficiently large so that the plate will not interfere with the operation of the pin 147. When there are no severed portions of the inserted slips on file on the pin 147, and the machine is operated, the first stub portion impaled by the pin 147 will remain just below the head of the pin when the pin returns to normal position. On the next operation as the table is raised the plate 180 moves to the rear in sufficient time to engage the first stub which is still carried at the top of the pin 147 and hold it stationary while the pin is pushed through it up to its highest position in which it impales the stub portion of the second slip inserted in the machine. Before the table is released and allowed to drop to its normal position the plate 180 is moved forwardly so that it will not interfere with the stub portion which is now carried on the upper part of the pin. It can be seen from Fig. 1 that as the operation of the machine continues and the stubs are accumulated on the pin they will gradually be forced down until they rest on the table 145. The last impaled slip however remains in a position just below the enlarged head of the pin 147 until the next operation. Because of the size of the hole produced by the enlarged head of the pin, the stubs are easily forced down over the pin.

If for any reason it is desired to remove the slips from the machine the entire pin may be easily removed by manually rocking the arm 148. The pin 147 can then be lifted out without removing the stubs carried by it and a new pin inserted. The impaling pin, because of its cross sectional shape, constitutes an effective means for preventing rotation of the stubs and consequent interference with the operation of the filing mechanism.

*Operation.*

A brief description of the operation of the machine will now be given, it being assumed that the machine is being used in the office of a telephone company.

When the customer comes in to pay his bill, he presents to the cashier his statement, which is in the form of a slip, such as that illustrated in Fig. 3. The cashier places the slip on the table 123 and then depresses a key representing his initial after which he depresses the amount keys 30 (Fig. 8) representing the amount $4.95 and then gives the operating handle 33 two complete revolutions.

During the operation of the machine, the differential segments 46 are differentially positioned and thereby through the gears 50, 51 and 52, cause the amount $4.95 to be accumulated upon the regular totalizer. The gear 50 through mechanism previously described also causes the amount commensurate with the value of the keys depressed to be indicated on the regular indicators which are operated by the gears 54.

The clerk's initial, which in this case is "B" and the amount "$4.95" and the consecutive number, which in this case is "11117" are printed upon the record strip from the type on the upper portion of the type wheels by the platen 68 (Fig. 6). The clerk's initial, the amount, the consecutive number, and the date are printed from the type on the lower portion of the type wheels by the platen 78 on the right hand portion of the slip, as illustrated in Fig. 3. The electrotype 232 also prints the word "Paid". After this printing on the right hand portion of the slip, the slip is fed to the right (Fig. 6) by the knurled disk 111 and the tension roll 125, after which the clerk's initial, the amount, the consecutive number and the date are printed from the lower type on the type wheels and the word "Paid" is printed from the electrotype 232 by the platen 234 upon the left hand portion of the slip.

After these two impressions, the movable knife 139 is moved down and severs the slip on the dotted line 235 (Fig. 3). Before the slip is severed, the arms 144 (Fig. 6) are rocked counter clockwise thereby raising the table 145 and forcing the filing pin 147 through the portion of the slip to be severed. After the strip is severed the table is then returned to its normal position and the machine is ready for a subsequent operation.

While the form of mechanism herein shown and described is admirably adapted to fulfil the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described, the combination of movably mounted record material retaining means, and means for moving record material toward said retaining means during movement of said retaining means.

2. In a machine of the class described, the combination of movably mounted record material retaining means, means for moving record material toward said retaining means, and means for simultaneously moving said retaining means toward said second mentioned means.

3. In a machine of the class described, the combination of a movably mounted record material retaining means, means for moving record material toward said retaining means, and means for moving said retaining means toward said second mentioned means during each operation of the machine.

4. In a machine of the class described, the combination of a movably mounted record material retaining means, means for moving record material toward said retaining means, and means for moving said retaining means toward said second mentioned means simultaneously with the movement of said record material.

5. In a machine of the class described, the combination of a movably mounted record material retaining means, means for moving record material toward said retaining means, and means for moving said first mentioned means toward said second mentioned means during movement of said record material during each operation of the machine.

6. In a machine of the class described, the combination of a recording mechanism for producing records on record material, a pivotally mounted pin file upon which such record material is adapted to be filed, and means for actuating the printing mechanism and pin file.

7. In a machine of the class described, the combination of a movable severing means, a pivotally mounted pin file, means actuated by said severing means for moving record material toward said pin file, and means for actuating said severing means and pin file.

8. In a machine of the class described, the combination of a pivotally mounted severing means, a pivotally mounted pin file, means actuated by said severing means for moving record material toward said pin file, and means for actuating said severing means and pin file.

9. In a machine of the class described, the combination of a pivotally mounted severing means, a movably mounted pin file, means actuated by said severing means for moving record material toward said pin file, and means for actuating said severing means and pin file.

10. In a machine of the class described, the combination of a movably mounted severing means, a movably mounted pin file, means carried by said severing means for moving record material toward said pin file, and means for moving said severing means and pin file toward each other.

11. In a machine of the class described, the combination of a filing pin, means for filing record material thereon, and other means cooperating with said filing pin for moving material filed thereon toward the base of said pin.

12. In a machine of the class described, the combination of a record material retaining means, means cooperating therewith for filing record material, and means independent of said second mentioned means for moving filed record material with respect to said retaining means preparatory to filing other record material.

13. In a machine of the class described, the combination of a pivotally mounted filing pin, means cooperating therewith for impaling record material thereon, and means movable with respect to said impaling means for moving record material impaled thereon toward the base of said pin.

14. In a machine of the class described, the combination of a pivotally mounted filing pin, means cooperating therewith for impaling record material thereon, and means for moving record material impaled on said pin toward the base thereof during movement of said pin.

15. In a machine of the class described, the combination of a filing pin mounted for movement in the direction of its length, and means movable substantially at right angles to the movement of said pin into position to cooperate therewith for moving impaled record material toward the base of the pin.

16. In a machine of the class described, the combination of a pivotally mounted impaling device, means cooperating therewith to file record material thereon, and slidably mounted means adapted to move into the path of movement of record material filed on said pin to move the same toward the base of the pin.

17. In a machine of the class described, a filing pin, and a support therefor adapted to fail under a predetermined amount of pressure exerted upon the filing pin during filing operations.

18. In a machine of the class described, a filing pin, a support therefor, and means adapted to permit relative movement between said pin and support under excessive pressure.

19. In a machine of the class described, a filing pin, a member against which said pin abuts, and means for holding said pin in contact with said member for supporting it in operative position.

20. In a machine of the class described, a filing pin, a supporting member therefor in contact with the side of said pin, and spring pressed means for pressing said members into close contact.

21. In a machine of the class described, a filing pin, a supporting member therefor, and means for creating a supporting frictional resistance between said pin and supporting member.

22. In a machine of the class described, a movably mounted impaling means, means for moving said impaling means in one direction by an operation of the machine, and means for automatically returning said impaling means to normal.

23. In a machine of the class described, a movably mounted impaling device movable against gravity by an operation of the machine, and means permitting said impaling device to return to normal.

24. In a machine of the class described, a movably mounted impaling means, and resilient means compressible by the movement of said impaling means in one direction to effect a return movement thereof to normal.

25. In a machine of the class described, a movably mounted impaling device movable from normal by an operation of the machine and automatically returnable to normal, and means for cushioning said device during its return to normal.

26. In a machine of the class described, a movable impaling device, and a lock for locking said device in normal position while the machine is in non-operated condition.

27. In a machine of the class described, a movable impaling device, and a pivoted lock for locking said device in normal position while the machine is in non-operated condition.

28. In a machine of the class described, a movable impaling device, a pivoted operating member therefor, and a pivoted lock for locking said operating member in its home position.

29. In a machine of the class described, a movable impaling device, a pivoted operating member therefor, a pivoted lock for locking said operating member in its home position, and means for moving said lock to unlocking position upon operation of the machine.

30. In a machine of the class described, a filing pin, record slip retaining means thereon, means cooperating with said pin for moving a record slip into position to be retained by said retaining means, and other means cooperable with said pin for moving said record slip in the direction of length of said pin.

31. In a machine of the class described, the combination of a printing mechanism adapted to make two impressions on a slip at each operation of the machine, a main operating mechanism, severing means adapted to sever said slip at a predetermined point, and means operated by the main operating mechanism for filing the severed portion of the slip in the machine.

32. In a machine of the class described, the combination of a movably mounted severing means, a movably mounted impaling means, a main operating mechanism, and separate actuating mechanisms for said impaling means and severing means operated by said main operating means.

33. In a machine of the class described, the combination of printing mechanism adapted to print on an inserted slip, means for severing a portion of such slip, an impaling device comprising a table pivoted at one end and carrying at its other end a pin, the table being adapted to be rocked on its pivot at every operation of the machine to cause the pin to impale the severed portion of the inserted slip.

34. In a machine of the class described, the combination of printing elements adapted to print twice on an inserted slip, means for severing the slip between the printed impressions, a curved paper guide attached to the severing mechanism and provided with an opening, and a pivoted table carrying a pin the head of which is adapted to cooperate with the opening in the paper guide to impale the severed portion of the slip.

35. In a machine of the class described, the combination of printing means adapted to print a plurality of times on an inserted slip, means for severing such slip between the printing impressions, an impaling device comprising a pivoted table carrying a pin adapted to impale the severed portion of the slip, and means for forcing the severed portion down on the pin.

36. In a machine of the class described, the combination of printing means for printing on inserted record material, means adapted to sever a portion of the record material, an impaling device comprising a table carrying a pin adapted to be manually detached therefrom, means for maintaining the pin in position on the table, and means for causing the pin to impale the severed portion of the record material.

37. In a machine of the class described, the combination of a filing pin, means for impaling slips thereon, and means on said pin for preventing rotation of said slips about said pin.

In testimony whereof I affix my signature.

EDWARD J. VON PEIN.